Feb. 4, 1969  J. SCHWARZSCHILD  3,425,759
GYROMOTOR BEARING
Filed March 16, 1966

INVENTOR
Jack Schwarzschild
BY
Shenier & O'Connor
ATTORNEYS

United States Patent Office 3,425,759
Patented Feb. 4, 1969

3,425,759
GYROMOTOR BEARING
Jack Schwarzschild, Stamford, Conn., assignor to United Aircraft Corporation, Hartford, Conn., a corporation of Delaware
Filed Mar. 16, 1966, Ser. No. 534,872
U.S. Cl. 308—188
Int. Cl. F16c *19/00, 21/00, 33/30*
2 Claims

ABSTRACT OF THE DISCLOSURE

A bearing for a gyromotor in which a plurality of sintered polyamide resin, lubricant-impregnated balls are intercalated between the solid steel balls of a bearing with all of the balls assembled between inner and outer bearing rings.

---

My invention relates to a bearing assembly and more particularly to a bearing assembly for rotatably supporting the sensitive element of a gyroscope for rotation around an axis while minimizing the possibility of unbalancing the element.

In a gyroscope assembly, sensitive elements such, for example, as the spin rotor of the assembly must be supported for rotary movement around an axis. If the assembly is to have the required accuracy, the element must be supported so as to minimize the possibility of unbalance thereof. Such unbalance might, for example, result from lubricant shift where conventional lubricating means are employed.

In the prior art it has been suggested that a gyro spin rotor, for example, be supported in a ball bearing, lubrication of which is achieved by the use of a ball retainer which has been impregnated with oil. In such an installation, oil from the retainer is wiped onto the raceways through the action of the rolling balls. While such an arrangement successfully achieves the objects of rotatably supporting the spin rotor and of lubricating the bearing, it incorporates an objectionable feature which assumes great significance in a sensitive installation. That is, where such a retainer is employed, it must permit some freedom of motion for proper bearing operation but this freedom is excessive for the standpoint of required performance of the instrument. Motion of the retainer unbalances the sensitive element of the gyroscope to such an extent as to render its performance unsatisfactory.

I have invented a ball bearing assembly for a gyroscope which is effectively lubricated and yet which minimizes the possibility of unbalance in the sensitive element of the gyroscope. My construction minimizes the tendency of elements of the bearing assembly to move in the direction of the axis of the supported element. My assembly does not require the use of a bearing retainer or of an external source of lubricant. It is simple and expeditious for the result achieved thereby.

One object of my invention is to provide a bearing assembly for rotatably supporting the sensitive element of a gyroscope while minimizing the possibility of unbalance in the element.

Another object of my invention is to provide a bearing assembly for the sensitive element of a gyroscope while minimizing the possibility of unbalance in the element owing to shift of parts of the assembly.

A further object of my invention is to provide a bearing assembly for a gyroscope, which assembly does not require either a ball retainer or an external source of lubricant.

Still another object of my invention is to provide a bearing assembly for a gyroscope which is simple in construction.

Other and further objects of my invention will appear from the following description.

In general my invention contemplates the provision of a bearing assembly for a gyroscope in which I provide a full complement of rolling elements including rolling elements of lubricant-impregnated porous material disposed respectively between adjacent metallic rolling elements to provide adequate bearing lubrication while at the same time minimizing the possibility of unbalance of the senstive element supported in the bearing.

In the accompanying drawings which form part of the instant specification and which are to be read in conjunction therewith and in which like reference numerals are used to indicate like parts in the various vews:

Figure 1:
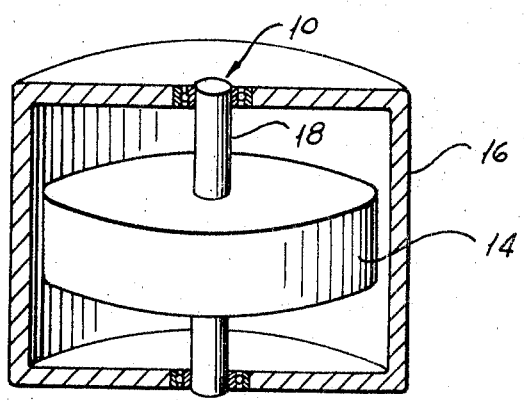
FIGURE 1 is a schematic view with parts in section illustrating one application of my gyroscope bearing assembly.

In one application of my gyroscope bearing assembly I may employ two assemblies indicated generally, respectively, by the reference characters 10 and 12 for rotatably supporting the spin rotor 14 in a casing or inner gimbal 16. Each of the bearing assemblies 10 and 12 receives one end of the rotor shaft 18.

Figure 2:
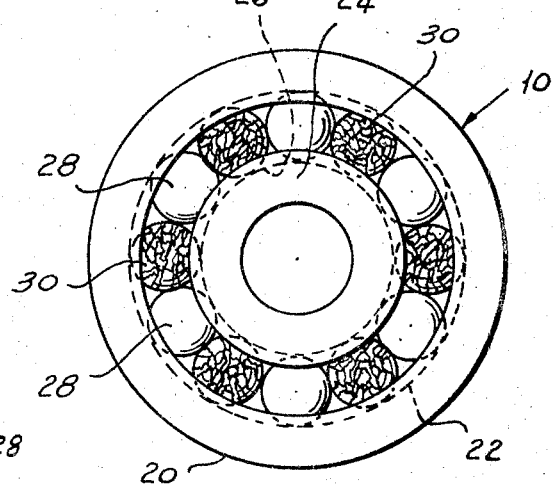
FIGURE 2 is a plan view of my gyroscope bearing assembly.

Referring now to FIGURE 2, I will describe in detail only one of the bearing assemblies 10 and 12 such, for example, as the assembly 10. The bearing assembly 10 includes an outer bearing ring 20 formed with a raceway 22 and an inner bearing ring 24 having an inner raceway 26 formed therein. My assembly includes a plurality of first, conventional rolling elements such as steel balls 28. Interspersed between the balls 28 are rolling elements 30 formed of porous material impregnated with lubricant in a manner to be described. From the construction thus far described, it will be apparent that I employ a full complement of rolling elements and that I dispose an element 30 between the elements 28 of each pair of adjacent elements 28. Owing to the fact that I employ a full complement of rolling elements, the balls 30 and 28 are in contact with each other all around the bearing assembly.

Figure 3:
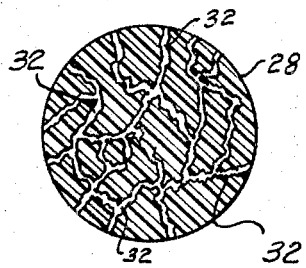
FIGURE 3 is a greatly enlarged fragmentary sectional view of one of the rolling elements of my gyroscope bearing assembly.

While I may form the elements 30 of any appropriate material which is adapted to be impregnated with a lubricant, such as oil, and which is suitable for formation of a bearing ball, preferably I employ sintered nylon. The sintered nylon of which the elements 30 are made may be prepared in accordance with the disclosure of U.S. Patent 2,695,425. Pursuant to the process disclosed therein, sintered nylon may be formed to have a predetermined percentage of voids, such as those identified by the reference character 32 in FIGURE 3. After the balls are manufactured they are subjected to a vacuum for a period of time to produce a partial vacuum through the interstices or channels 32 of the material. When the partial vacuum has been produced, the elements are immersed in lubricating oil for a period of time sufficient to cause the oil to flow into the channels.

To assemble the bearing the rolling elements are placed between the inner ring 24 and the outer ring 20 in a manner known to the art, with an oil-impregnated sintered nylon element 30 disposed between each pair of adjacent metal elements 28. In performing this assembly operation, I so choose the separator balls as to minimize ball train eccentricity, thus reducing the noise output of the bearing.

In operation of my bearing assembly in supporting a gyroscope rotor 14 or the like, as the rolling elements 28 wipe against the elements 30, lubricant is distributed over the surface of each of the elements 28 and lubricant also is applied to the bearing raceways. Owing to the fact that no ball separator is required, the possibility of unbalance of the supported element is minimized. Centrifugal acceleration tends to constrain the rolling elements from motion in the direction of the bearing axis, thus reducing mass shifts and resultant drift in the gyroscope.

It will be seen that I have accomplished the objects of my invention. I have provided a ball bearing assembly for a gyroscope, which bearing is effectively lubricated and yet which minimizes the possibility of unbalance in the sensitve element of the gyroscope. My construction does not require the use of a bearing retainer or of an external source of lubricant. It is simple in construction and expeditious in operation.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A bearing assembly including in combination an outer ring, an inner ring, raceways formed in said rings, a full complement of balls disposed between said rings in said raceways, said balls including a plurality of solid metal balls and a plurality of porous sintered polyamide resin balls interspersed with said metal balls with one porous ball between the metal balls of pairs of adjacent metal balls, and a lubricant impregnating said porous balls.

2. A bearing assembly as in claim 1 in which said lubricant is a liquid.

References Cited

UNITED STATES PATENTS

| | | |
|---|---|---|
| 2,609,256 | 9/1952 | Baker et al. |
| 3,027,626 | 4/1962 | Murphy. |
| 2,695,425 | 11/1954 | Stott _____ 308—238 |

FOREIGN PATENTS

| | | |
|---|---|---|
| 833,699 | 7/1938 | France. |
| 314,736 | 10/1956 | Switzerland. |

MARTIN P. SCHWADRON, *Primary Examiner.*

F. SUSKO, *Assistant Examiner.*

U.S. Cl. X.R.

308—200